United States Patent [19]

Campbell et al.

[11] Patent Number: 4,601,610
[45] Date of Patent: Jul. 22, 1986

[54] APPARATUS AND METHOD FOR UNDERWATER VALVE COMPONENT ASSEMBLY AND DISASSEMBLY

[75] Inventors: Colin T. Campbell; Richard J. Clements; John F. Robinson; Alan J. Waring, all of Chester, England

[73] Assignee: Shell Oil Company, Houston, Tex.

[21] Appl. No.: 698,197

[22] Filed: Feb. 4, 1985

[30] Foreign Application Priority Data

Jun. 5, 1984 [GB] United Kingdom ................. 8414345

[51] Int. Cl.$^4$ ........................ B63C 11/00; F16L 1/04
[52] U.S. Cl. ..................................... 405/188; 405/158
[58] Field of Search ............... 405/158, 154, 168–170, 405/173, 188, 195; 166/338, 339, 340, 341, 342, 356, 365

[56] References Cited

U.S. PATENT DOCUMENTS

| Re. 31,265 | 6/1983 | Sinclair et al. | 405/169 |
| 3,204,417 | 9/1965 | Robley | 405/170 |
| 3,464,489 | 9/1969 | Thomas | 166/365 X |
| 3,983,708 | 10/1976 | Houot | 405/195 |
| 4,142,584 | 3/1979 | Brewer et al. | 166/365 X |
| 4,218,158 | 8/1980 | Tesson | 405/170 |
| 4,278,362 | 7/1981 | Scherrer | 166/339 X |
| 4,329,085 | 5/1982 | Morrill et al. | 405/169 |
| 4,541,754 | 9/1985 | Castel et al. | 405/169 X |

Primary Examiner—Cornelius J. Husar
Assistant Examiner—Nancy J. Stodola

[57] ABSTRACT

An apparatus and a method for removing a component from, or placing a component on, an underwater valve comprises a base attachable to the flowline that carries the valve, and a two part assembly having a gantry that is aligned and mounted on the base and a sliding frame placed in sliding engagement with the gantry. The sliding frame guides the component towards or away from the underwater valve, after the gantry is properly aligned with respect to the valve by its connection to the base.

9 Claims, 4 Drawing Figures

APPARATUS AND METHOD FOR UNDERWATER VALVE COMPONENT ASSEMBLY AND DISASSEMBLY

BACKGROUND OF THE INVENTION

Field of the Invention

The invention relates to an apparatus and a method for removing a component from, or placing a component on, an underwater valve.

SUMMARY OF THE INVENTION

It is an object of the invention to provide an apparatus suitable for removing a component from, or placing a component on, an underwater valve in a controlled manner.

For this purpose, the apparatus according to the invention comprises a gantry, connecting means on the gantry for connecting a hoisting cable thereto, docking means on the gantry for joining the gantry to a base located on or near the underwater valve, a sliding frame slidably arranged on the gantry, means for securing the component to the sliding frame, and a system for displacing the sliding frame relative to the gantry.

The invention further relates to a method of removing a component from an underwater valve with the use of the apparatus according to the invention comprising the steps of:

(a) lowering a gantry to the underwater valve;
(b) joining the gantry to a base located adjacent the valve;
(c) securing a sliding frame carried by the gantry to the component to be removed;
(d) releasing the component from the valve;
(e) raising the sliding frame relative to the gantry; and
(f) lifting the gantry from the underwater valve.

In addition thereto the invention relates to a method of placing a component on an underwater valve with the use of the apparatus according to the invention comprising the steps of:

(a) securing the component to a sliding frame carried by a gantry;
(b) lowering the gantry to the underwater valve;
(c) joining the gantry to a base located adjacent the valve;
(d) lowering the sliding frame relative to the gantry so as to bring the component to a desired position;
(e) connecting the component to the valve;
(f) releasing the component from the sliding frame; and
(g) lifting the gantry from the underwater valve.

When the gantry has been joined to the base, the sliding frame is slidable in a direction which is parallel to a central axis (which axis is vertical or substantially vertical) of the underwater valve along which the components should be removed or placed. Therefore there is no risk of damaging the components or the underwater valve, when a component of the underwater valve is replaced.

The invention will now be described in more detail by way of example with reference to the drawings.

DESCRIPTION OF THE PREFERRED EMBODIMENT

Figure 1:
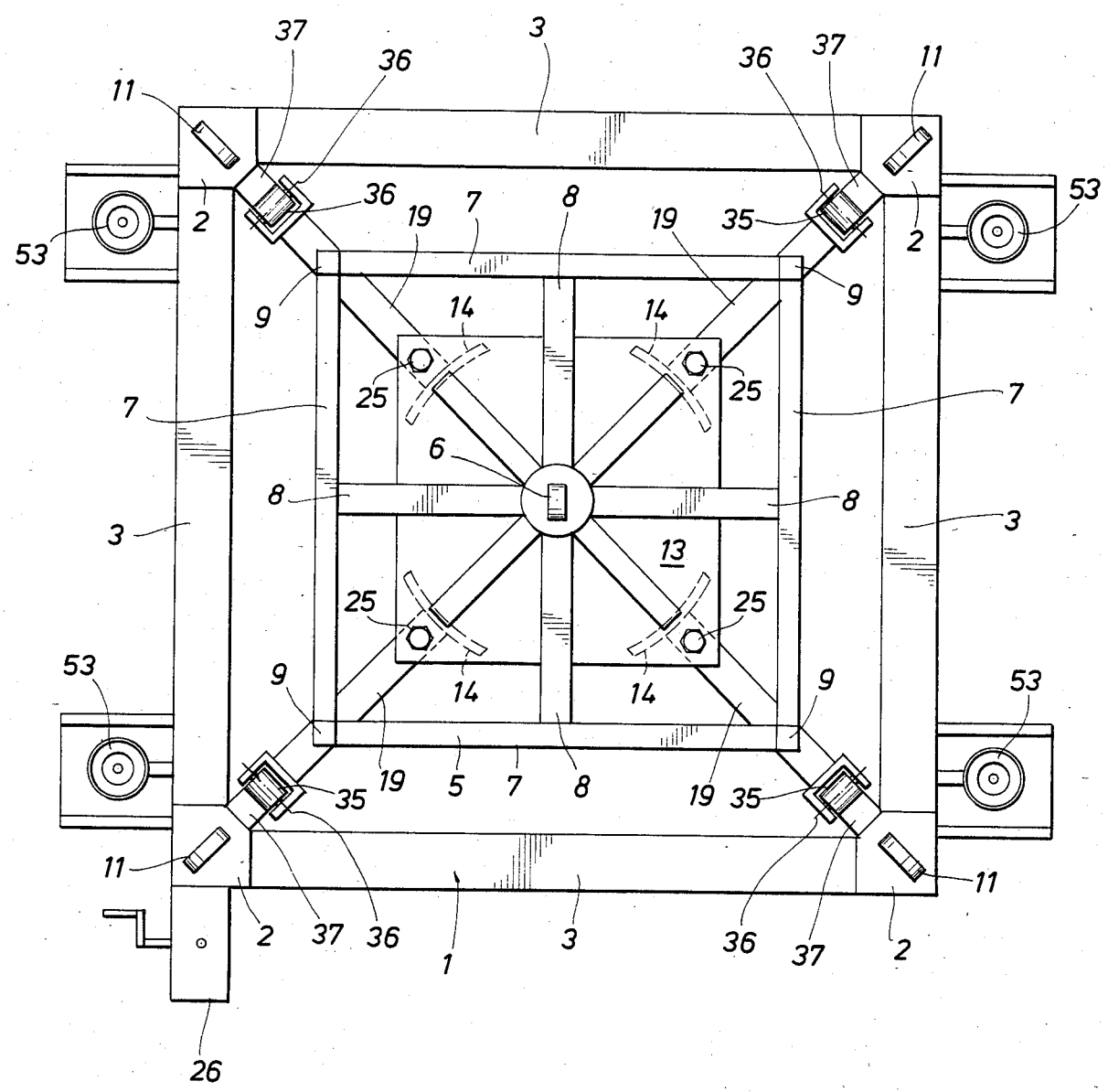
FIG. 1 shows schematically a top view of the apparatus according to the invention.
Figure 2:
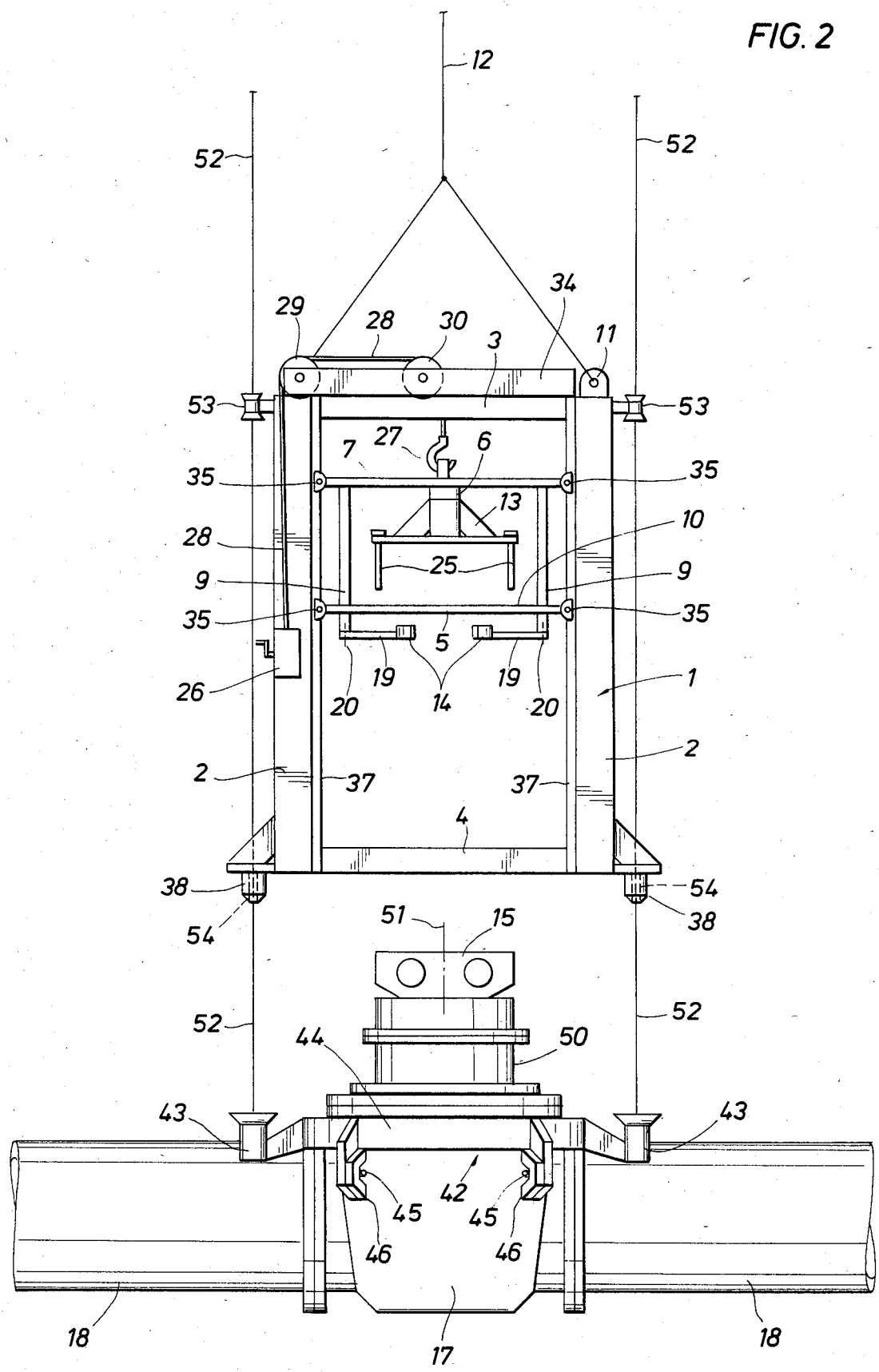
FIG. 2 shows schematically a side-view of the same apparatus during lowering of the gantry to an underwater valve.

As shown in FIG. 1, and FIG. 2, the apparatus comprises a gantry 1 having four uprights 2, connected to each other by horizontal members 3 and 4, and a sliding frame 5, which is slidably arranged in the gantry 1, and which comprises a central connection element 6, to which upper horizontal members 7 are connected by support elements 8, and vertical members 9 connected to the upper horizontal members 7 and to lower horizontal members 10.

The gantry is provided with hoisting cable connecting means 11 to which a hoisting cable 12 is releasably connected.

The sliding frame 5 is provided with component securing means comprising in the preferred embodiment a pick-up member 13 with holding elements 14 for securing to the sliding frame 5 an actuator unit 15 of an underwater valve 17 arranged in pipeline 18. The pick-up member 13 is releasably connected to the central connection element 6 of the sliding frame 5, and the holding elements 14 are arranged on extendible arms 19, which are rotatably about axis 20 connected to vertical members 9 of the sliding frame 5. Moreover, the pick-up member 13 is provided with bolts 25 which can be screwed in threaded holes (not shown) in the actuator unit 15.

The apparatus further comprises a hoist 26 arranged on the gantry 1 for displacing the sliding frame 5. The hoist is connected to the sliding frame 5 by means of a hook 27 and a hoist line 28 which is guided over pulleys 29 and 30 connected to a hoisting bar 34 which is secured to the top section of the gantry 1, thus forming a sliding frame displacement means. For the sake of clarity, the hoisting bar 34 with the pulleys 29 and 30 and the hoist line 28 with the hook 27 are not shown in FIG. 1.

To guide the displacement of the sliding frame 5 relative to the gantry 1, the sliding frame 5 is provided with rollers 35 rotable about axis 36, which can run along guide rails 37 attached to the uprights 2 of the gantry 1.

The gantry 1 is provided with docking pins 38 for joining the gantry 1 to a base 42 arranged on the underwater valve 17. The base 42 comprises mating funnels 43 for receiving the docking pins 38, which mating funnels 43 are attached to a cradle 44 connected by means of pins 45 to locating plates 46 which are welded to the housing of the underwater valve 17.

As an operative example of the method of removing a component from the underwater valve 17 with the use of the apparatus, removing the actuator unit 15 will now be described. At first the gantry 1 is lowered (see FIG. 2) at the end of the hoisting cable 12 by means of hoisting means (not shown) arranged on a support vessel (not shown), until the gantry 1 reaches the underwater valve 17. Then, for example with the aid of a diver (not shown), the gantry 1 is so positioned that the docking pins 38 can enter the mating funnels 43, and the gantry 1 is further lowered so as to be joined to the base 42.

Thereupon the diver lowers the sliding frame 5 to a lower position, screws the bolts 25 in the threaded holes (not shown) in the actuator unit 15, and connects the holding elements 14 to the lower part of the actuator unit 15.

Figure 3:
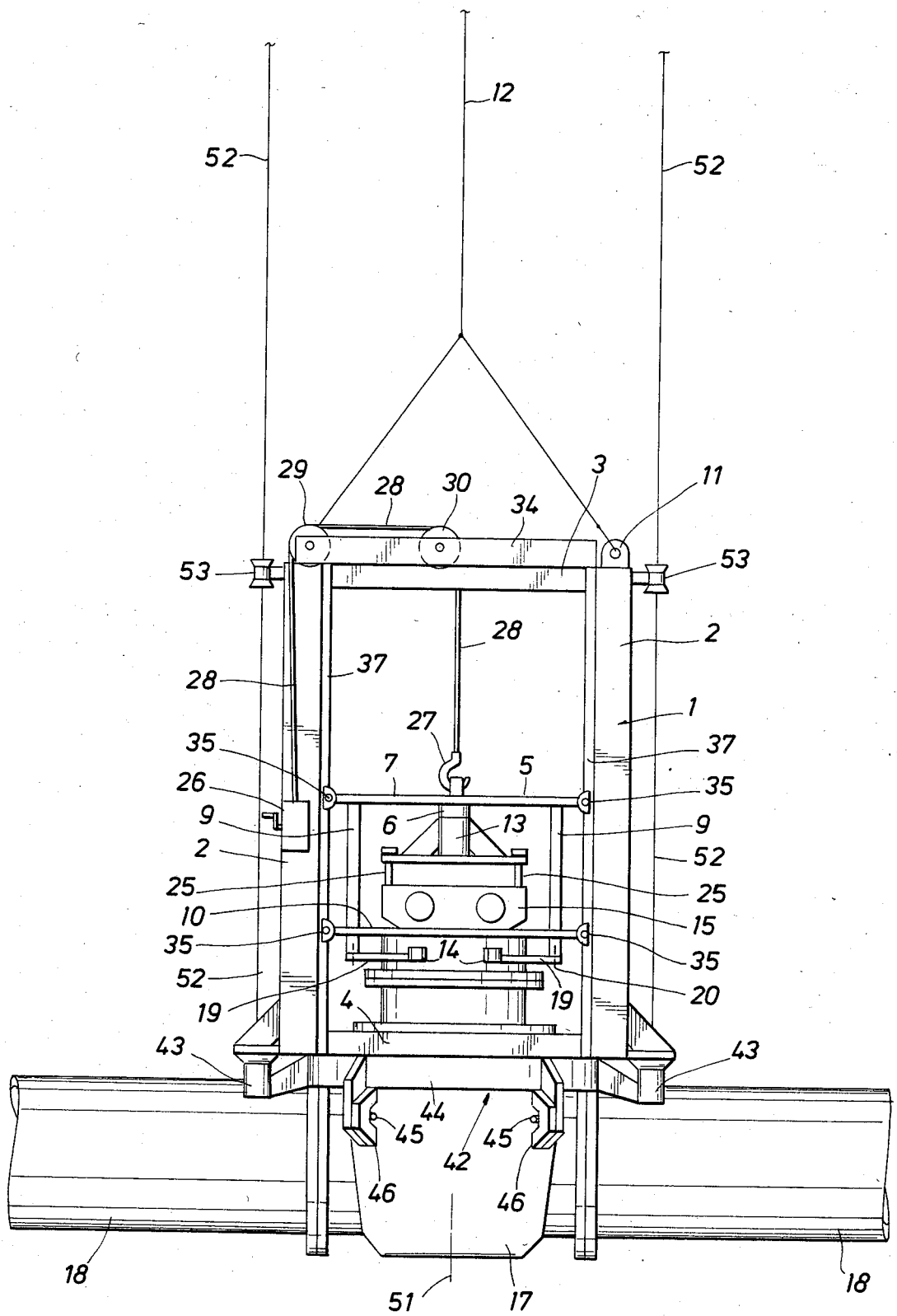
FIG. 3 shows schematically a side-view of the same apparatus after the gantry has been joined to a base attached to the underwater valve.

When the actuator unit 15 is secured to the sliding frame 5 (see FIG. 3), the diver (not shown) releases the actuator unit 15 by undoing the bolt and nut assemblies (not shown) which join the lower flange of the actuator unit 15 to the upper flange of the bonnet 50 of the valve 17. Then the diver raises the sliding frame 5, with the actuator unit 15 attached thereto, to an upper position with use of the hoist 26, wherein the sliding frame 5 is displaced in a direction which is parallel to a central axis 51 of the underwater valve 17 along which the components of the valve 17 should be removed or placed, which central axis 51 is vertical or substantially vertical.

Figure 4:
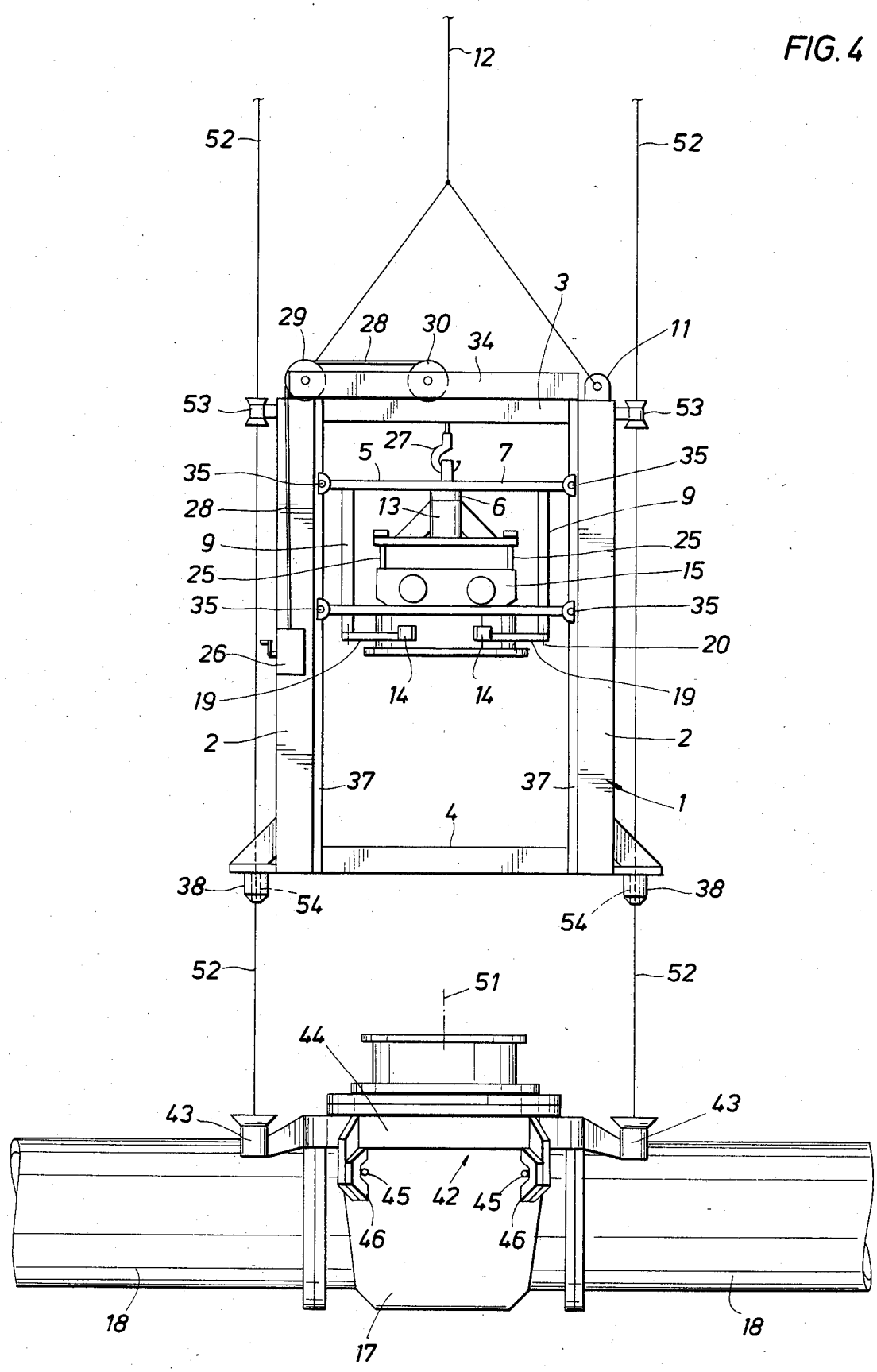
FIG. 4 shows schematically a side-view of the same apparatus during the lifting of the gantry from the underwater valve wherein a valve component is secured to the sliding frame, reproduced on a scale smaller than the scale of FIG. 1.

Subsequently the gantry 1 is lifted from the valve 17 (see FIG. 4) and brought on board of the support vessel (not shown), where the actuator unit 15 is taken out of the sliding frame 5.

Placing the actuator unit 15 on the underwater valve 17 comprises the above-described steps in a reverse order. At first, on board of the support vessel (not shown), the actuator unit 15 is secured to the sliding frame 5, and the sliding frame 5 is raised to an upper position, near the top section of the gantry 1. Then the gantry 1 is lowered to the underwater valve 17 by the hoisting cable 12, and secured to the base 42. Thereupon the diver lowers the sliding frame 5 so as to allow placement of the actuator unit 15 on the valve 17, wherein the sliding frame 5 is displaced in a direction which is parallel to the central axis 51 of the valve 17. Subsequently the actuator unit 15 is secured to the valve 17, released from the sliding frame 5, and the gantry 1 is lifted from the valve 17.

If required, the above-described method of removing the actuator unit 15 from the underwater valve 17 can also be applied to remove other components of the valve 17, for example, the bonnet 50 and although it is located in the housing of the valve 17, the valve body (not shown). These components can be placed by applying the above-described method of placing the actuator unit 15 on the valve.

Since, when removing the actuator unit 15 or other component from the valve 17 or when placing the component thereon, the sliding frame 5 is lowered or raised in the direction wherein components of the valve 17 should be removed or placed, and since lowering and raising of the sliding frame 5 is controlled in situ, the valve 17 or the component will not be damaged when the component is removed from the valve 17 or placed thereon.

It will be appreciated that for removing or placing a component other than the actuator unit 15 the pick-up member 13 used for holding the actuator unit 15 should be replaced by a suitable pick-up member 13 to which the component can be secured.

If desired, the hoisting bar 34 can be releasably secured to the top section of the gantry 1 to allow lifting of the sliding frame 5 out of the gantry 1, so as to facilitate replacing of a pick-up member 13.

In order to correct misalignment of the sliding frame 5, the rollers 35 can be attached to extendible arms of which the length can be adjusted.

In an alternative embodiment of the sliding frame displacement means the sliding frame 5 is displaced by means of two hydraulic lifting cylinders (not shown), well known to the art, arranged at opposite sides of the gantry 1. To control the operation of the lifting cylinders the gantry 1 is provided with a control unit which is connected to a pump on the support vessel by means of a hose (not shown).

Latching means (not shown), well known to the art can be provided with which the diver can secure the gantry 1 to the base 42 to prevent tipping of the gantry 1.

To facilitate guiding of the gantry 1 as it is lowered to the valve 17 or raised from the valve 17, use can be made of guide means such as guide lines 52 and guide funnels 53 carried by the gantry 1, where the guide lines 52 extend from the support vessel (not shown) to the mating funnels 43 of the base 42. These guide lines 52 pass through the guide funnels 53 arranged on the gantry 1 and through bores 54 in the docking pins 38.

In the above-described embodiments of the invention the base 42 is attached to the underwater valve 17, so that when the apparatus is joined to the base 42, the sliding frame 5 is slidable in the direction in which the components of the valve 17 should be removed or placed, even if the valve 17 is tilted owing to torsion in the underwater pipeline 18.

However if the underwater valve 17 cannot tilt, for example, because it is fixed to a foundation, it is not required that the base be attached to the valve 17, in this case the base 42 can be attached to the foundation.

The invention is not restricted to a gantry 1 having four uprights 2, the gantry 1 may, for example, comprise three uprights 2.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

We claim as our invention:

1. Apparatus for removing a component from, or placing a component on, an underwater valve, located on the ocean floor beneath a floating vessel, said apparatus comprising:
   base means attachable in a preferred aligned orientation to said underwater valve,
   a gantry lowerable through the water for engaging said base,
   hoisting cable connection means carried by the gantry for connecting a hoisting cable to the gantry,
   a sliding frame carried by, aligned, and slideably engaged with said gantry,
   docking means carried by the gantry for alignment and engagement of the gantry on said base, and alignment of said sliding frame with respect to said underwater valve,
   component securing means carried by said sliding frame, for engaging, aligning and securing said component to said sliding frame, and
   sliding frame displacement means operatively engaged between said gantry and said sliding frame for displacing the sliding frame relative to the gantry.

2. The apparatus of claim 1, wherein said sliding member includes a removable pick-up member connected to said sliding member.

3. The apparatus of claim 1, wherein said sliding frame includes a plurality of holding elements operatively engaged with said sliding frame.

4. The apparatus of claim 1, wherein said sliding frame includes rollers carried by said sliding frame and guide rails carried by said gantry along which said rollers travel.

5. The apparatus of claim 1, wherein said sliding frame displacement means includes,
   a hoist carried by said gantry,
   a hoist line on the hoist, with its free end operatively connected to said sliding frame for raising and lowering the sliding frame.

6. The apparatus of claim 1 wherein said base means includes a cradle connectable to said valve, and mating elements for receiving said docking means of said gantry.

7. The apparatus of claim 1, wherein said gantry includes guide means along which guide lines can pass.

8. Method of removing a component from an underwater valve, comprising the steps of:
   lowering a gantry to the underwater valve;
   joining the gantry to a base located adjacent the valve;
   securing a sliding frame carried by the gantry to the component to be removed;
   releasing the component from the valve;
   raising the sliding frame relative to the gantry; and
   lifting the gantry from the underwater valve.

9. Method of placing a component on an underwater valve comprising the steps of:
   securing above the surface of the water the component to a sliding frame carried by a gantry;
   lowering the gantry through the water to the underwater valve;
   joining the gantry to a base located adjacent the valve;
   lowering the sliding frame relative to the gantry so as to bring the component to a desired position;
   connecting the component to the valve;
   releasing the component from the sliding frame; and
   lifting the gantry from the underwater valve.

* * * * *